(12) United States Patent
Chen et al.

(10) Patent No.: US 10,985,602 B2
(45) Date of Patent: Apr. 20, 2021

(54) AUTOMATIC POWER SWITCHING SYSTEM AND ELECTRONIC DEVICE CAPABLE OF SWITCHING POWER SUPPLY

(71) Applicant: QISDA OPTRONICS (SUZHOU) CO., LTD., Suzhou (CN)

(72) Inventors: Qianmo Chen, Suzhou (CN); Jian Shen, Suzhou (CN)

(73) Assignee: QISDA OPTRONICS (SUZHOU) CO., LTD., Suzhou (CN)

( * ) Notice: Subject to any disclaimer, the term of this patent is extended or adjusted under 35 U.S.C. 154(b) by 113 days.

(21) Appl. No.: 16/445,231

(22) Filed: Jun. 19, 2019

(65) Prior Publication Data

US 2020/0144855 A1    May 7, 2020

(30) Foreign Application Priority Data

Nov. 7, 2018  (CN) .......................... 2018 1 1321454
Apr. 19, 2019 (CN) .......................... 2019 1 0318182

(51) Int. Cl.
| | |
|---|---|
| G06F 1/26 | (2006.01) |
| H02J 7/06 | (2006.01) |
| H02J 9/06 | (2006.01) |
| H02J 7/10 | (2006.01) |

(52) U.S. Cl.
CPC .............. *H02J 9/061* (2013.01); *G06F 1/263* (2013.01); *H02J 7/06* (2013.01); *H02J 9/068* (2020.01); *H02J 2007/10* (2013.01)

(58) Field of Classification Search
CPC .... G06F 1/263; G06F 1/28; H02J 7/06; H02J 9/06; H02J 9/061; H02J 2007/10; H02J 9/068
USPC ................................................ 307/43, 64, 85
See application file for complete search history.

(56) References Cited

U.S. PATENT DOCUMENTS

2014/0001872 A1\*  1/2014  Zhou ....................... H02J 1/108
                                                                 307/85

\* cited by examiner

*Primary Examiner* — Toan T Vu
(74) *Attorney, Agent, or Firm* — Winston Hsu

(57) ABSTRACT

An automatic power switching system includes a first power interface module coupled to a first power supply terminal for obtaining a first power signal, a second power interface module coupled to a second power supply terminal for obtaining a second power signal, a power input identification module for identifying whether the first power signal meets a requirement, a power output module for receiving the first power signal or the second power signal and for providing a corresponding power signal to a power consumption module, and a switch module for turning on the second power interface module and the power output module when confirming the first power signal not meeting the requirement.

10 Claims, 1 Drawing Sheet

AUTOMATIC POWER SWITCHING SYSTEM AND ELECTRONIC DEVICE CAPABLE OF SWITCHING POWER SUPPLY

BACKGROUND OF THE INVENTION

1. Field of the Invention

The present invention relates to the field of power supply control, and particularly, to an automatic power switching system and an electronic device.

2. Description of the Prior Art

With the development of technology, electronic devices can be applied to a variety of applications. At the same time, in order to reduce design and production costs, it is necessary to fully consider the generalization of electronic devices. In order to resolve the contradiction between the above two requirements, an electronic device is usually designed to switch between different application scenarios. However, for different usage environments, such as high operating temperatures or large temperature differences, switching between power supplies may be misjudged due to component characteristics, resulting in switching to an incorrect power supply, causing operational errors. Therefore, it is necessary to design an automatic power switching system and electronic equipment to overcome the above drawbacks.

SUMMARY OF THE INVENTION

An embodiment provides an automatic power switching system. The automatic power switching system includes a first power interface module coupled to a first power supply terminal for obtaining a first power signal, a second power interface module coupled to a second power supply terminal for obtaining a second power signal, a power input identification module configured to identify whether the first power signal meets a requirement, a power output module configured to receive the first power signal or the second power signal and to provide a corresponding power signal to a power consumption module, and a switch module configured to turn on the second power interface module and the power output module when confirming the first power signal not meeting the requirement. The switch module includes a first terminal coupled to the second power interface module, a second terminal coupled to the power output module, and a control terminal coupled to an output terminal of the power input identification module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
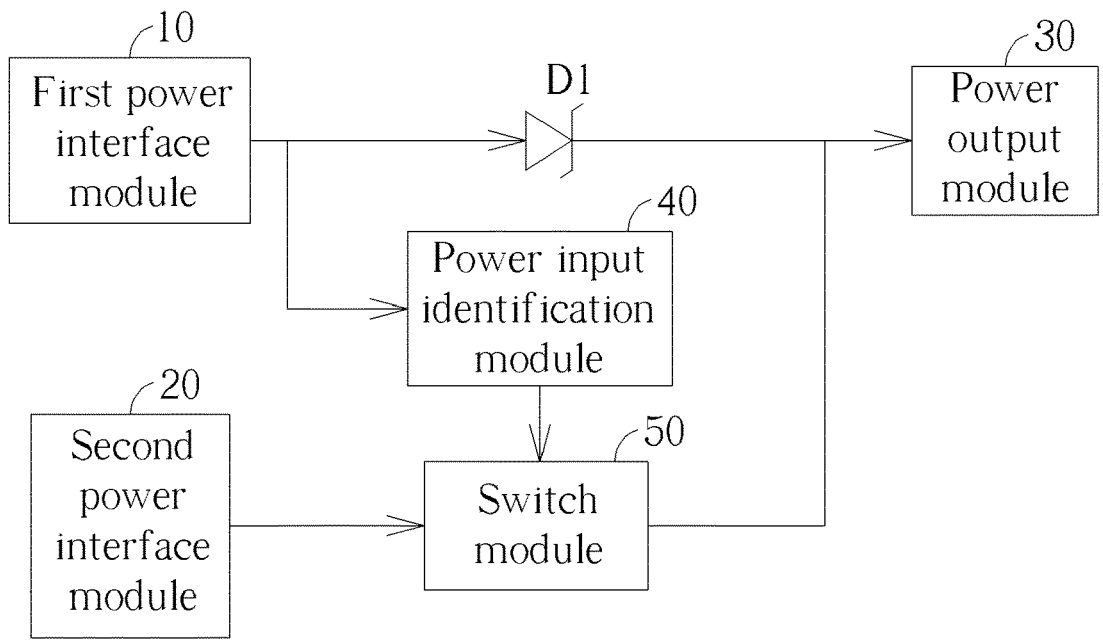
FIG. 1 shows a diagram of an embodiment of an automatic power switching system of the present invention.

FIG. 1 shows a diagram of an embodiment of an automatic power switching system of the present invention. The automatic power switching system includes a first power interface module 10, a second power interface module 20, and a power output module 30, a power input identification module 40 and a switch module 50.

The first power interface module 10 is coupled to a first power supply terminal to obtain the first power signal Vin1 and to output the first power signal Vin1 to the power output module 30. The first power signal Vin1 can be obtained directly from the first power supply terminal, or can be obtained by processing the power signal from the first power supply terminal through the first power interface module 10. The first power supply terminal is coupled to a power supply external to the electronic device, which may be a power supply network or a generator. In actual operation, the first power supply terminal may be coupled to a DC power supply or an AC (alternating current) power supply. Preferably, when it is a DC (direct current) power supply, the first power interface module 10 includes a voltage regulation and filtering unit to obtain a pure DC power supply. The voltage regulation and filtering unit may be a Zener diode and a capacitor shown in FIG. 2 or other components or circuits for voltage regulation and filtering, but the invention is not limited thereto. Most household power supply and the industrial power supply are alternating current. If the first power supply terminal is coupled to a DC power supply, a power adapter may be connected outside the device to convert the AC power supply to a DC power supply. In addition, the power adapter can also be integrated into the first power interface module 10. The invention is not limited thereto. In this embodiment, the first power signal Vin1 output by the first power interface module 10 is a DC voltage signal.

The second power interface module 20 is coupled to the second power supply terminal for obtaining and outputting the second power signal Vin2 to the switch module 50. The second power signal Vin2 can be obtained directly from the second power supply terminal or can be obtained from the processing of the second power interface module 20. The second power supply terminal may be a power supply inside the electronic device, which may be a power supply from a cooperative device of the electronic device or may be a battery module. For example, a display device with multiple power supplies can be used as a stand-alone electronic device disposed outside the electronic device and coupled to the first power supply through a power line, such as a household power supply system. It can also be integrated and hidden inside the display device. In this case, it is better to use an internal power supply to maintain a simple and clean appearance of the display device. The internal power supply can be a battery or other components of the electronic device. Other components of the electronic device may be device modules in communication with the display device or device modules not in communication with the display device, for example, a power supply system inside a machine tool or a functional module supplied with substantially the same voltage in a machine tool. In this embodiment, the second power signal Vin2 output by the second power interface module 20 is a DC voltage signal.

The first power interface module 10 and the second power interface module 20 are also interchangeable, and the invention is not limited thereto.

The power input identification module 40 is configured to identify whether the first power signal Vin1 meets the requirement. For example, it identifies whether the first power supply terminal has a signal, whether the first power signal Vin1 meets the requirement or whether the voltage value is higher than a threshold value. The power input identification module 40 delivers the result to the switch module 50.

The switch module 50 includes a first terminal, a second terminal and a control terminal. The first terminal is coupled to the second power interface module 20. The second terminal is coupled to the power output module 30. The control terminal is coupled to the output terminal of the power input identification module 40. The switch module 50 is configured to determine whether to access the second power signal Vin2 based on the result of the power input identification module 40. When it determines that the first power signal Vin1 does not exist or does not meet the requirement, the switch module 50 turns on the second power interface module 20 and the power output module 30, which are respectively coupled to the first terminal and the second terminal. Preferably, the switch module 50 can also be configured to disconnect the second power interface module 20 and the power output module 30 when confirming that the first power signal Vin1 meets the requirements. In other words, the switch module 50 can selectively connect or disconnect the second power signal Vin2.

The power output module 30 is configured to receive the first power signal Vin1 or the second power signal Vin2 and provide a corresponding power signal to other modules. The power output module 30 receives the first power signal Vin1 or the second power signal Vin2 to obtain a power signal Vout (for example, Vout=Vin1 or Vin2). It can also generate the power signal corresponding to the voltage required by each module in the electronic device. The power consumption module can provide power to, for example, control processors, graphics processors, sensors, memory modules . . . etc. The invention is not limited thereto.

Figure 2:
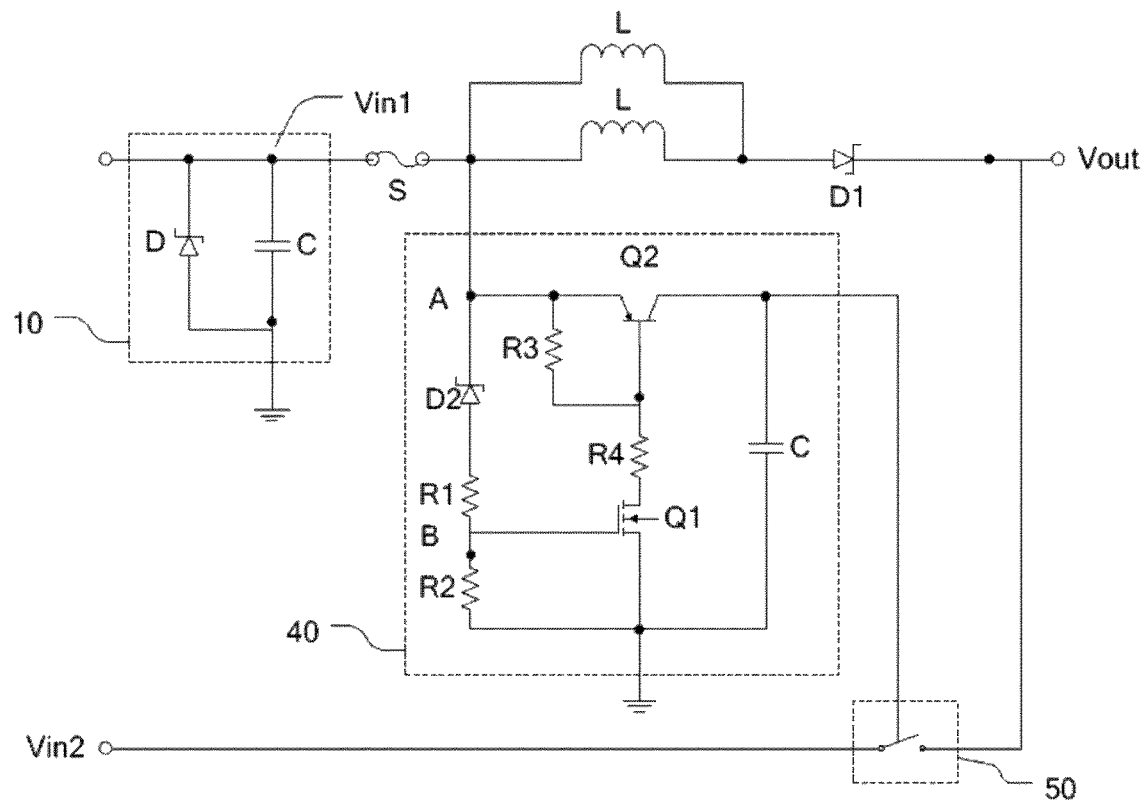
FIG. 2 shows a circuit diagram of an embodiment of an automatic power switching system.

As shown in FIG. 1 and FIG. 2, an anode of a first diode D1 is coupled to the first power interface module 10, and a cathode is coupled to the second terminal of the switch module 50 and the power output module 30. In general, when the second power interface module 20 is turned on, the voltage of the second power signal Vin2 is transmitted to the power output module 30, and is also reversely applied to the first power interface module 10. Some components in the first power interface module 10 may be damaged as the result. In addition, the external terminal of the first power interface module 10 may have electrical charges, posing a safety hazard to personnel and equipment. After adding the first diode D1, when the second power interface module 20 is turned on, the voltage of the second power signal Vin2 would not be applied to the first power interface module 10 by the reverse cut-off effect of the first diode D1, therefore eliminating the described hazard. Preferably, a Schottky diode, a Zener diode, or a circuit module composed of a Schottky diode or a Zener diode can be used. The combination of the switch module 50 and the first diode D1 in the present invention make the circuit more stable and reliable than the single-pole double-throw switch with the first power signal Vin1 and the second power signal Vin2 as two input signals.

Since the leakage current of the Schottky diode is greatly affected by temperature, it is necessary to consider the access location of the power input identification module 40. The access location (or sampling location, such as the first node A shown in FIG. 2) of the power input identification module 40 is an arbitrary position between the output of the first power interface module 10 and the input of the power output module 30. Preferably, in order to alleviate the adverse effect of the first diode D1 on the power input identification module 40, the first node A may be disposed at the anode of the first diode D1.

FIG. 2 is a circuit diagram of an embodiment of an automatic power switching system. In the power input identification module 40, the first node A is coupled to a cathode of a second diode D2. An anode of the second diode D2 is coupled to a terminal of a first resistor R1, and the other terminal of the first resistor R1 is coupled to a terminal of a second resistor R2 and a gate terminal of a field effect transistor (FET) Q1. A source terminal of the field effect transistor Q1 is grounded. The first node A is also coupled to the emitter terminal of the transistor Q2 and a terminal of a third resistor R3. A base terminal of the transistor Q2 is coupled to the other terminal of the third resistor R3 and a terminal of a fourth resistor R4. The other terminal of the fourth resistor R4 is coupled to the drain terminal of the field effect transistor Q1. A collector terminal of transistor Q2 serves as the output of power supply input identification module 40. The first resistor R1 and the second resistor R2 forma voltage divider to supply power to the gate terminal of the field effect transistor Q1. The second diode D2 may be a Schottky diode or a Zener diode. The field effect transistor Q1 is preferably an N-type metal oxide semiconductor field effect transistor (MOSFET).

For example, when the first power signal Vin1 outputted by the first power interface module 10 reaches a predetermined voltage (for example, 12V), the field effect transistor Q1 is turned on and the drain voltage of the field effect transistor Q1 is pulled down which turns on the transistor Q2. The output signal is high, so the switch module 50 is turned off. At this time, the power output module 30 obtains the first power signal Vin1. When the first power signal Vin1 obtained by the first power interface module 10 is lower than the Zener voltage of the second diode D2, the voltage of the second node B between the first resistor R1 and the second resistor R2 is approaching the ground voltage. The field effect transistor Q1 is not turned on and the drain voltage of the field effect transistor Q1 is pulled high. Also, the transistor Q2 is at off state and the output signal is low, so that the switch module 50 is turned on and the power output module 30 obtains the second power signal Vin2. In this embodiment, when the first power signal Vin1 obtained and output by the first power interface module 10 reaches the predetermined voltage, regardless of the second power signal Vin2 at this time, the power output module 30 obtains the first power signal Vin1. The second power signal Vin2 obtained and output by the second power interface module 20 is used only when the first power signal Vin1 cannot meet the requirement. In actual operation, the other settings may also be applied.

In the actual operation, when the first power signal Vin1 obtained and output by the first power interface module 10 cannot meet the requirement, the second power signal Vin2 obtained and output by the second power interface module 20 is provided to the power output module 30, and the second power signal Vin2 is reversely applied to the line between the first power interface module 10 and the power output module 30. When the first diode D1 employs a Schottky diode, the leakage current of the first diode D1 increases as the ambient temperature rises (for example, to 65° C.). In this way, when the voltage at the first node A is higher than the Zener voltage of the second diode D2 (For example, the voltage of the second power signal Vin2 is 12V, the voltage at the first node A is 8.2V and the Zener voltage of the second diode D2 is 7.5V.), the voltage at the terminal (coupled to the second diode) of the first resistor R1 is 0.7V. If the resistance of the first resistor R1 is 1 KΩ, and the resistance of the second resistor R2 is 10 KΩ, the gate voltage of the field effect transistor Q1 (the voltage at the second node B) is Vb=0.7*(10/11)=0.636V. The threshold voltage VGS of the gate terminal of the field effect transistor Q1 is usually between 2V and 4V, and the threshold voltage of a triode is usually 0.7V. Therefore, the advantage of using the field effect transistor in the present invention over using a triode is that it can avoid conduction at the field effect transistor Q1 or abnormal on-off repetition. Specifically, the field effect transistor Q1 can be conducted, which causes the transistor Q2 to be turned on, thereby causing the switch module 50 to turn on the second power interface module 20 and the power output module 30, or the field effect transistor Q1 is repeatedly turning on and off. At this time, the first power signal Vin1 provided by the first power interface module 10 does not meet the requirement. When the first power interface module 10 and the power output module 30 form a conduction path, in actual situation there is no power connected to the power output module 30. Thus, the power output module 30 may have no power supply (the transistor Q2 is continuously turned on) or may be fluctuating (the transistor Q2 is in an on-off state), resulting in the electronic device cannot operate normally and may even cause damage to the electronic device. Since the field effect transistor Q1 in this case is preferably an N-type MOSFET, the threshold voltage VGS is usually between 2V and 4V, so the abovementioned problem of field effect transistor Q1 being wrongly conducted can be avoided. Further, by making the resistance ratio of the first resistor R1 and the second resistor R2 to be in the range of 1 to 5 or preferably by making the resistance ratio equal. The voltage at the second node B can further control on-off switching of the field effect transistor Q1. Thus, it can maintain the field effect transistor Q1 to switch normally under high temperature condition. Specifically, when the first power signal Vin1 provided by the first power interface module 10 cannot meet the requirement, even if the ambient temperature is high causing the leakage current of the first diode D1 to increase, and the voltage at the second node B is still lower than the threshold voltage of the field effect transistor Q1. It would cause the second power interface module 20 to be connected to the power output module 30 for stable power supply. In addition, since the thermal stability of field effect transistors is also superior to triodes, using field effect transistor in the present invention can ensure safer, more stable, and lower power consumption device than using triodes. When the first power signal Vin1 provided by the first power interface module 10 meets the requirement, the voltage at the second node B is higher than the threshold voltage of the field effect transistor Q1, so that the first power interface module 10 is connected to the power output module 30 to receive power. In other words, whether there is power at the first power supply terminal and/or the second power supply terminal, the power input identification module 40 is not affected to erroneously conduct or cut-off. Preferably, the resistance of the first resistor R1 and the second resistor R2 may be ranging from 200Ω to 2 kΩ. Preferably, the resistance of the first resistor R1 and the second resistor R2 may be 1 kΩ to achieve better voltage division and current reduction.

In addition, the present invention further provides an electronic device. The electronic device includes the automatic power switching system of any one of the aforementioned embodiments, and a module requiring power supply coupled to the automatic power switching system. The module requiring power supply may be an electronic component such as a control processor, a graphics processor, a sensor, or a memory device. The invention is not limited thereto.

In summary, the present invention provides an automatic power switching system and an electronic device. The automatic power switching system determines which power supply to connect by identifying whether one of the power supplies has normal input. By using the first diode, the second diode, the field effect transistor and the triode, it can also avoid the adverse effect of other power problems and the safety issues of electrical conduction from selecting power supplies.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An automatic power switching system, comprising:
a first power interface circuit, coupled to a first power supply terminal, and configured to obtain a first power signal;
a second power interface circuit, coupled to a second power supply terminal, and configured to obtain a second power signal;
a power input identification circuit, configured to identify whether the first power signal meets a requirement;
a power output circuit, configured to receive the first power signal or the second power signal and to provide a corresponding power signal to a power consumption circuit; and
a switch circuit, configured to turn on the second power interface circuit and the power output circuit when confirming the first power signal not meeting the requirement, the switch circuit comprising:
a first terminal coupled to the second power interface circuit;
a second terminal coupled to the power output circuit; and
a control terminal coupled to an output terminal of the power input identification circuit;
wherein: the first power interface circuit is coupled to an anode of a first diode, a cathode of the first diode is coupled to the second terminal of the switch circuit and the power output circuit, the power input identification circuit comprises a first node coupled to a cathode of a second diode, an anode of the second diode is coupled to a terminal of a first resistor, and another terminal of the first resistor is coupled to a terminal of a second resistor and a gate terminal of a field effect transistor, another terminal of the second resistor and a source terminal of the field effect transistor are grounded;
the first node is further coupled to an emitter terminal of a triode and a terminal of a third resistor, and a base terminal of the triode is coupled to another terminal of the third resistor and one terminal of a fourth transistor, another terminal of the fourth resistor is coupled to a drain terminal of the field effective transistor;
a collector terminal of the triode serves as an output of the power input identification circuit, the first resistor and the second resistor have a resistance ratio ranging from 1 to 5.

2. The automatic power switching system of claim 1, wherein the first resistor and the second resistor have a resistance ranging from 200Ω to 2 kΩ.

3. The automatic power switching system of claim 1, wherein the first resistor is 1 kΩ, and the second resistor has a resistance ranging from 200Ω to 1 kΩ.

4. The automatic power switching system of claim 1, wherein the first node is further coupled to the anode of the first diode.

5. The automatic power switching system of claim 1, wherein the first diode is a Schottky diode or a Zener diode.

6. The automatic power switching system of claim 1, wherein the switch circuit is further configured to disconnect the second power interface circuit and the power output circuit when the first power signal is present.

7. The automatic power switching system of claim 1, wherein the first power supply terminal is an external power source of an electronic device.

8. The automatic power switching system of claim 1, wherein the second power supply terminal is an internal power supply of an electronic device, a power supply provided by a cooperative device of the electronic device or a battery circuit.

9. The automatic power switching system of claim 1, wherein the field effect transistor is an N-type metal oxide semiconductor field effect transistor.

10. An electronic device comprising: an automatic power switching system of claim 1; a power consumption circuit coupled to the automatic power switching system.

\* \* \* \* \*